United States Patent
Suzuki et al.

[19]

[11] Patent Number: 5,964,314
[45] Date of Patent: Oct. 12, 1999

[54] POWER STEERING DEVICE

[75] Inventors: Katsuhiro Suzuki; Shinichi Hagidaira, both of Kani; Masashi Takai; Tadao Hasegawa, both of Minokamo, all of Japan

[73] Assignee: Kayaba Industry Co., Ltd., Tokyo, Japan

[21] Appl. No.: 09/040,098

[22] Filed: Mar. 17, 1998

[30] Foreign Application Priority Data

Jun. 19, 1997 [JP] Japan ..................................... 9-179006
Nov. 17, 1997 [JP] Japan ..................................... 9-332477

[51] Int. Cl.$^6$ .............................. B62D 15/00; F15B 9/10
[52] U.S. Cl. ......................... 180/400; 91/375 A; 180/417
[58] Field of Search .................................... 180/400, 444, 180/447, 446, 443, 445, 441, 421, 422, 417, 414; 91/375 A, 375 R; 137/625.22

[56] References Cited

U.S. PATENT DOCUMENTS

5,241,893  9/1993  Guasch et al. ......................... 91/375 A
5,562,016 10/1996  Schöffel ................................. 180/417
5,871,064  2/1999  Suzuki et al. .......................... 180/400

*Primary Examiner*—Douglas C. Butler
*Attorney, Agent, or Firm*—Steinberg & Raskin, P.C.

[57] ABSTRACT

A power steering device capable of facilitating assembling thereof and eliminating a variation in elastic force acting on an input shaft of the power steering device. Leaf spring structures each of which includes a first leaf spring and a second leaf spring are arranged. The first leaf spring includes a spring-side support section constituted by a V- or U-shaped groove, a pair of rolling surface sections arranged so as to be contiguous to the spring-side support section and outwardly extend from both ends of the spring-side support section, a pair of support leg sections each arranged so as to be contiguous to each of the rolling surface sections and outwardly extend therefrom, and a pair of holding sections each arranged so as to be contiguous to each of the support leg sections and outwardly extend therefrom. The holding sections each are pressedly contacted with press contact surfaces or side surfaces of a spring receiving chamber, resulting in the first leaf spring being securely held. The second leaf spring acts to exhibit elastic force required for forcing balls or rollers against an input shaft from a rear surface of the first leaf spring.

9 Claims, 8 Drawing Sheets

POWER STEERING DEVICE

BACKGROUND OF THE INVENTION

This invention relates to a power steering device, and more particularly to a power steering device wherein an input shaft and an output shaft are connected to each other through a torsion bar.

In a power steering device having a torsion bar incorporated therein, a resistance encountered during operation of steering wheels is partially caused due to a torsional resistance of a torsion bar. However, when the steering wheels are at a neutral position, they are free from the torsional resistance of the torsion bar, so that they are reduced in neutral rigidity, resulting in being deteriorated in stability during straight running or traveling of a vehicle.

In order to solve the problem, a power steering device which is constructed so as to apply preset force to the steering wheels to increase neutral rigidity thereof is proposed as disclosed in, for example, Japanese Patent Application Laid-Open Publications Nos. 507362/1994 and 507363/1994.

Figure 13:
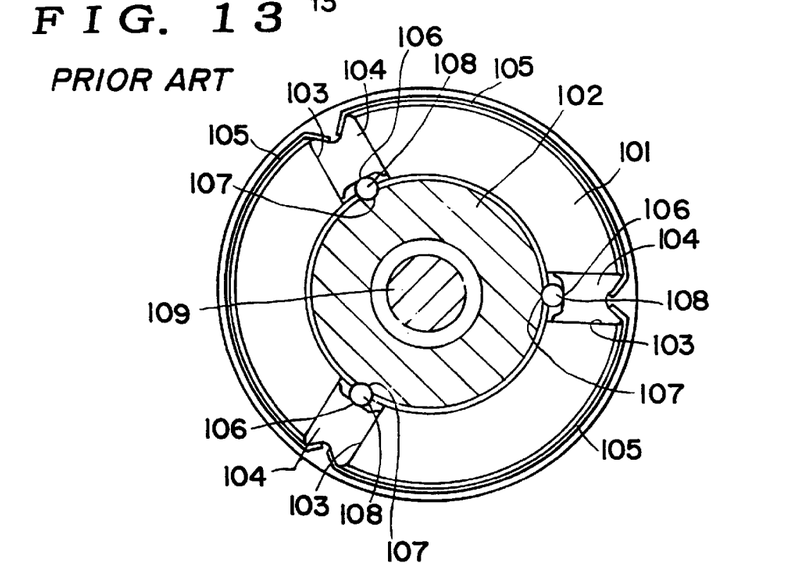
FIG. 13 is a schematic view showing a preset force applying mechanism incorporated in a conventional power steering device.

Now, the power steering device proposed will be described hereinafter with reference to FIG. 13. The power steering device proposed, as shown in FIG. 13, is so constructed that a support 101 associated with an output shaft (not shown) is arranged around an input shaft 102. The support 101 is formed with a plurality of slide holes or grooves 103, which are arranged in a manner to be spaced from each other at predetermined intervals in a circumferential direction of the support 101. The slide grooves 103 each have a plunger 104 slidably fitted therein. The plungers 104 each have elastic force applied thereto by means of C-shaped springs 105 arranged around the support 101. This results in each of the plungers 104 being forced toward a center of the input shaft 102.

The plungers 104 each are formed at a distal end thereof with a recess or cutout 106. Correspondingly, the input shaft 102 is formed on an outer peripheral surface thereof with cutouts or recesses 107, which are arranged so as to be opposite to the recesses 106 of the plungers 104 when the output shaft and input shaft are at a neutral position, respectively. Between each of the recesses 106 and the recess 107 corresponding thereto is arranged a roller 108.

In the power steering device thus constructed, elastic force of the C-shaped springs 105 is applied as the preset force to the input shaft 102 through the plungers 104 and rollers 108 during a neutral state of the steering wheels.

When the steering wheels are turned, followed by inputting of torque of a predetermined level thereto, the input shaft and output shaft are rotated relatively to each other while twisting the torsion bar 109. This causes each of the rollers 108 to be dislocated from the recesses 106 and 107, so that the rollers 108 each are moved between the outer periphery of the input shaft 102 and a rolling surface formed on a distal end of the plunger 104. Also, the conventional power steering device permits elastic force of each of the C-shaped springs 105 which acts as the preset force to act on the input shaft 102 through the plunger 104.

However, the plungers 104 each are required to be slidably fitted in each of the slide holes 103 formed in the support 101, resulting assembling of the power steering device being highly troublesome. Also, even when the slide hole 103 and plunger 104 are formed with increased dimensional accuracy, the plunger necessarily causes any backlash. Such backlash of the plunger 104 interferes with application of the preset force to the input shaft 102, so that the power steering device fails to exhibit its inherent or essential function. Also, it causes a variation in elastic force of the C-shaped springs 105 acting on the input shaft 102 during a rolling action of the rollers 108.

SUMMARY OF THE INVENTION

The present invention has been made in view of the foregoing disadvantage of the prior art.

Accordingly, it is an object of the present invention to provide a power steering device which is capable of facilitating assembling thereof.

It is another object of the present invention to provide a power steering device which is capable of eliminating a variation in elastic force acting on an input shaft of the power steering device.

It is a further object of the present invention to provide a power steering device which is capable of providing preset force sufficient to enhance neutral rigidity of steering wheels of a vehicle, to thereby ensure stability in straight running or traveling of the vehicle.

It is still another object of the present invention to provide a power steering device which is capable of preventing dislocation of balls or rollers from between an input shaft and a spring structure.

It is yet another object of the present invention to provide a power steering device which is capable of exhibiting increased durability.

It is even another object of the present invention to provide a power steering device which is capable of minimizing displacement of a spring structure.

It is a still further object of the present invention to provide a power steering device which is capable of facilitating incorporation of a spring structure therein.

It is a yet further object of the present invention to provide a power steering device which is capable of providing a satisfactory steering feeling.

It is an even further object of the present invention to provide a power steering device which is capable of facilitating control of assisting force characteristics thereof and exhibiting increased assisting force characteristics.

In accordance with the present invention, a power steering device is provided. The power steering device includes an input shaft operatively connected to steering wheels, an output shaft operatively connected to wheels, and a torsion bar for connecting the input shaft and output shaft to each other therethrough, wherein the input shaft and output shaft generate assisting force depending on the amount of rotation thereof when they are rotated relatively to each other while twisting the torsion bar. The power steering device also includes a member arranged so as to be rotated integrally with the output shaft, a spring setting section provided at one of the output shaft and member, a pair of leaf spring structures arranged in the spring setting section so as to interpose the input shaft therebetween, wherein the leaf spring structures each are provided with a spring-side support section and the input shaft is formed on an outer peripheral surface thereof with shaft-side support sections, each of which is arranged so as to be opposite to the spring-side support section of each of the leaf springs when the input shaft and output shaft are in a neutral state. The power steering device further includes balls or rollers each interposedly arranged between each of the spring-side support sections and each of the shaft-side support sections opposite to each other, wherein the balls or rollers are arranged so as to deflect the leaf spring structures, resulting in being displaced from the spring-side and shaft-side support sections while rolling therebetween when the input shaft and output shaft are rotated relatively to each other and also the balls or rollers each are arranged so as to roll between each of the leaf spring structures and the input shaft after they are displaced from the support sections.

The power steering device of the present invention generally constructed as described above is featured in that the leaf spring structures each are constituted by a first leaf spring and a second leaf spring; wherein the first leaf spring of each of the leaf spring structures includes the above-described spring-side support section constituted by a V- or U-shaped groove, a pair of rolling surface sections arranged so as to be contiguous to the spring-side support section and outwardly extend from both ends of the spring-side support section, a pair of support leg sections each arranged so as to be contiguous to each of the rolling surface sections and outwardly extend therefrom, and a pair of holding sections each arranged so as to be contiguous to each of the support leg sections and outwardly extend therefrom, the holding sections of the first leaf spring are pressedly contacted with press contact surfaces defining the spring setting section, and the second leaf spring of each of the leaf spring structures is constructed so as to exhibit elastic force for forcing each of the balls or rollers toward the input shaft through a rear surface of the first leaf spring.

In a preferred embodiment of the present invention, the first leaf spring further includes a pair of stoppers each arranged between each of the rolling surface sections and each of the support leg sections, wherein the balls or rollers each are arranged so as to be abutted against each of the stoppers when the input shaft and output shaft are rotated in a predetermined amount relatively to each other.

In a preferred embodiment of the present invention, a pair of the support leg sections of the first leaf spring are formed in a manner to be inclined toward the input shaft and a pair of the holding sections of the first leaf spring which are contiguous to the support leg sections are formed so as to be curved in a direction away from the input shaft.

In a preferred embodiment of the present invention, a portion of each of the holding sections pressedly contacted with the press contact surfaces of the spring setting section is positioned substantially on an extension line defined by connecting two points on the spring support section at which the spring support section is contacted with the balls or rollers at a neutral state.

In a preferred embodiment of the present invention, the input shaft is formed with a rolling surface contiguous to each of both sides of each of the shaft-side support sections, wherein the rolling surface of the input shaft is formed so as not to conform to an arcuate surface defined about a center of the input shaft, the balls or rollers each are constructed so as to roll between each of the rolling surface sections of the first leaf spring and the rolling surface of the input shaft when the input shaft and output shaft are rotated relatively to each other after the balls or rollers are dislocated from the spring-side and shaft-side support sections, and the balls or rollers are also constructed in such a manner that force at a contact point between each of the balls or rollers and the rolling surface of the input shaft generates a component in a direction identical with or opposite to a direction of rotation of the input shaft.

In a preferred embodiment of the present invention, the member provided with the spring setting section is formed with an insertion hole, into which a fixing member is inserted to connect the member directly or indirectly to the output shaft. Also, the insertion hole and fixing member are so arranged that a clearance which permits a position at which the member is connected to the output shaft to be finely adjusted is defined therebetween.

In a preferred embodiment of the present invention, the second leaf springs each are constituted by a plurality of leaf spring elements superposed on each other.

In a preferred embodiment of the present invention, two or three of the leaf spring elements of the second leaf spring are previously fixedly superposed on each other.

In a preferred embodiment of the present invention, the second leaf spring is curved at both ends thereof toward the input shaft.

BRIEF DESCRIPTION OF THE DRAWINGS

These and other objects and many of the attendant advantages of the present invention will be readily appreciated as the same becomes better understood by reference to the following detailed description when considered with the accompanying drawings, wherein.

DETAILED DESCRIPTION OF THE PREFERRED EMBODIMENTS

Now, a power steering device according to the present invention will be described hereinafter with reference to FIGS. 1 to 12, wherein like reference numerals designate like or corresponding parts throughout.

Referring first to FIGS. 1 to 4, a first embodiment of a power steering device according to the present invention is illustrated, which is embodied in the form of a hydraulic power steering device. A power steering device of the illustrated embodiment is in the form of a hydraulic power steering device of the integral type and so constructed that a piston (not shown) is incorporated in a power cylinder 1 and an output shaft 2 is inserted through the piston. Then, the piston and output shaft 2 are associated with or operatively connected to each other by means of a ball nut (not shown). Also, the piston is engaged with a sector gear (not shown), so that the sector gear may be rotated due to movement of the piston. Such rotation of the sector gear permits wheels operatively connected thereto to be steered.

Figure 1:
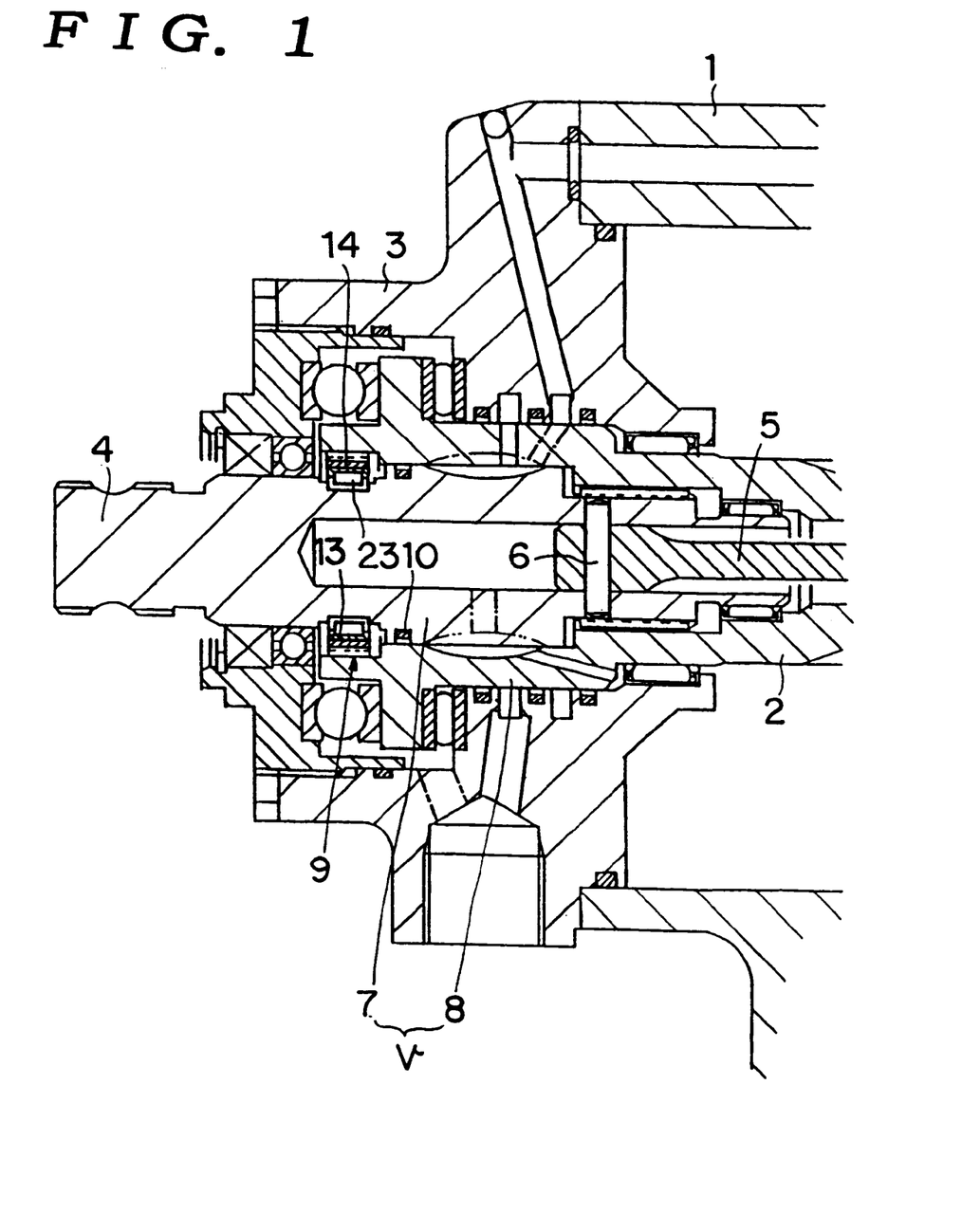
FIG. 1 is a fragmentary sectional view showing an essential part of a first embodiment of a power steering device according to the present invention, which is embodied in the form of a hydraulic power steering device.

The power cylinder 1 has a valve casing 3 mounted on an end thereof so as to close the end. The output shaft 2 is rotatably supported at a proximal end thereof in the valve casing 3. The output shaft 2 is formed into a hollow configuration and an input shaft 4 is rotatably inserted at a distal end thereof into the distal end of the output shaft 2.

The input shaft 4 and output shaft 2 are connected to each other through a torsion bar 5. More particularly, the torsion bar 5 is inserted at one end thereof into the input shaft 4 and fixed at the other end thereof in the output shaft 2. A portion of the one end of the torsion bar 5 inserted into the input shaft 4 is fixed to the input shaft 4 by means of a pin 6. The input shaft 4 and output shaft 2 thus arranged are adapted to be rotated relatively to each other while twisting the torsion bar 5.

The input shaft 4 is integrally formed on an outer surface thereof with a rotary spool 7. Correspondingly, the output shaft 2 is integrally formed on an inner peripheral surface thereof opposite to the rotary spool 7 of the input shaft 2 with a sleeve 8. The rotary spool 7 and sleeve 8 thus formed are fittedly engaged with each other in a manner to be rotatable relatively to each other, resulting in constituting a rotary valve v.

When steering wheels (not shown) are turned to rotate the input shaft 4 and output shaft 2 relatively to each other, the rotary valve v thus provided is changed over. Such changing-over of the rotary valve v permits any one of pressure rooms defined or compartmented in the power cylinder 1 to be fed with hydraulic oil, as well as hydraulic oil in the other pressure chamber to be discharged therefrom, so that a pressure difference between both pressure chambers leads to movement of the piston to rotate the sector gear, resulting in assisting force being applied to the steering wheels.

In the power steering device of the illustrated embodiment thus generally constructed, the output shaft 2 is formed at a distal end thereof with a spring receiving chamber 9 acting as a spring setting section. The spring receiving chamber 9 is separated or isolated from the rotary valve v by means of a seal member 10.

Figure 2:
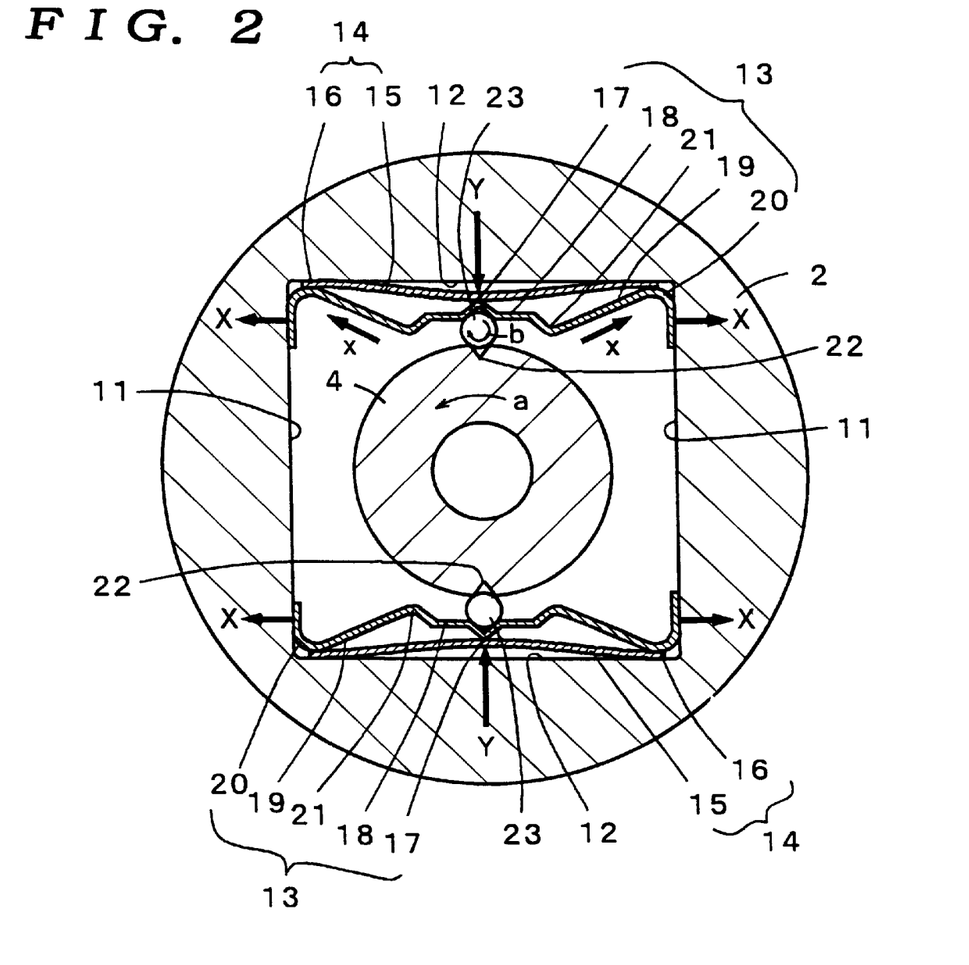
FIG. 2 is a sectional view showing a spring receiving chamber defined in the power steering device of FIG. 1.

The spring receiving chamber 9, as shown in FIG. 2, is formed by scooping out a hole of a substantially square shape in the distal end of the output shaft and defined by four side surfaces 11 and 12 perpendicular to each other in order, wherein the side surfaces 11 are opposite to each other and the side surfaces 12 are opposite to each other. The spring receiving chamber 9 has a pair of spring structures each of which is constructed of a first leaf spring 13 and a second leaf spring 14 received therein. The first and second leaf springs 13 and 14 are combined with each other as shown in FIG. 2. The first leaf springs 13 are arranged opposite to each other while being spaced from each other and the second leaf springs 14 are arranged opposite to each other with the first leaf springs 13 being interposed therebetween.

Figure 3:
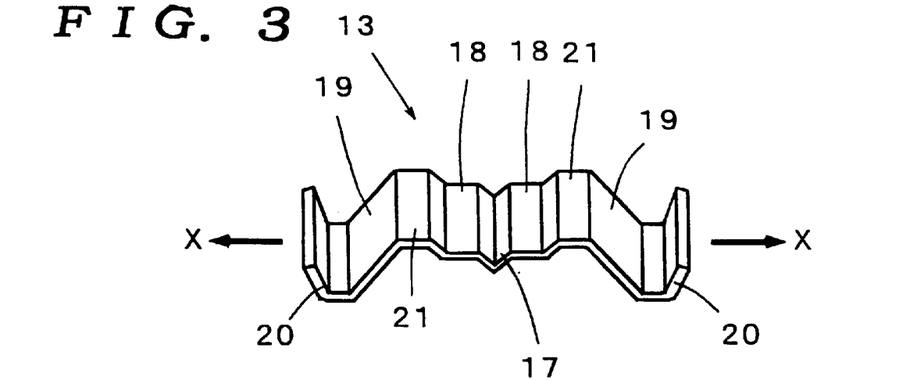
FIG. 3 is a perspective view showing a first leaf spring incorporated in the power steering device of FIG. 1.

The first leaf spring 13 constituting a part of each of the spring structures, as shown in FIGS. 2 and 3, includes a central spring-side spring support section 17 constituted by a V- or U-shaped groove, a pair of rolling surface sections 18 formed so as to be contiguous to both ends of the spring-side support section 17 and outwardly extend therefrom while interposing the spring support section 17 therebetween, a pair of support leg sections 19 formed so as to be contiguous to the rolling surface sections 18 and outwardly extend therefrom, and a pair of curved holding sections 20 formed so as to be contiguous to the support leg sections 19 and outwardly extend therefrom. In the first leaf spring 13 thus constructed, the holding sections 20 are normally kept expanded in both lateral directions or in directions indicated at arrows X in FIG. 3. The first leaf spring 13 may include a pair of projection sections 21 each arranged between the rolling surface section 18 and the support leg section 19. The projection sections 21 each acts as a stopper.

Figure 4:
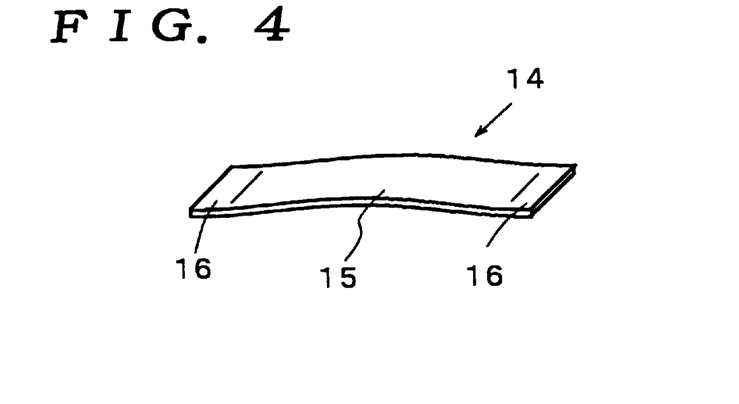
FIG. 4 is a perspective view showing a second leaf spring incorporated in the power steering device of FIG. 1.

The second leaf springs 14, as shown in FIGS. 2 and 4, each include a curved section 15 and a flat sections 16 arranged on both ends of the curved section 15 so as to interpose the curved section 15 therebetween. The second leaf springs 14 thus constructed each are arranged in such a manner that each of the flat section 16 is contacted with each of the side surfaces 12 of the spring receiving chamber 9 perpendicular to the side surfaces 11 thereof. Then, the first leaf springs 13 each are superposedly arranged on the second leaf spring 14. At this time, the first leaf spring 13 is securely held on the second leaf spring 14 while pressedly contacting the curved holding sections 20 which are kept expanded with the side surfaces 11 of the spring receiving chamber 9.

Such arrangement of the first and second leaf springs 13 and 14 permits an apex of the curved section 15 of the second lead spring 14 to be positioned on a rear side of the spring-side support section 17 of the first leaf spring 13. Also, it permits each of the flat sections 16 of the second leaf spring 14 to be interposedly held between a lower end of each of the curved holding sections 20 of the first leaf spring 13 and the side surface 12 of the spring receiving chamber 9, resulting in each of the second leaf springs 14 being fixed in the spring receiving chamber 9.

The input shaft 4, as shown in FIG. 2, is formed on a portion of an outer peripheral surface thereof positioned in the spring receiving chamber 9 with a pair of V- or U-shaped grooves 22 each acting as a shaft-side supporting section in a manner to be opposite to each other in a diametric direction of the input shaft 4.

The spring-side support sections 17 and shaft-side support sections 22 are arranged so as to be opposite to each other in a neutral state of the power steering device wherein the input shaft 4 and output shaft 2 are kept from being rotated relatively to each other, with each of balls or rollers 23 being interposedly arranged between the spring-side support section 17 of each of the first leaf springs 13 and each of the shaft-side support sections 22 of the input shaft 4. The support sections 17 and 22 are subject to two-point contact with the ball or roller 23, so that the ball or roller 23 may be supported between the support sections 17 and 22.

Such arrangement of each of the balls or rollers 23 between the support sections 17 and 22 results in each of the second leaf springs 14 being forced in a direction opposite to a direction indicated at Y in FIG. 2, leading to deformation of the second leaf spring 14. This permits initial load to be generated in the second leaf springs 14 in the Y-direction, so that the initial load may act as preset force on the input shaft 4 through the balls or rollers 23. At this time, the first leaf springs 13 each are in a state of generating initial load in the Y-direction, as well as initial load in the X-directions sufficient to pressedly contact the holding sections 20 with the side surfaces 11 of the spring receiving chamber 9.

Now, the manner of operation of the power steering device of the illustrated embodiment thus constructed will be described.

When steering wheels of a vehicle are held at a neutral position thereof, the input shaft 4 and output shaft 2 are at such a neutral position as shown in FIG. 2. In the neutral state, initial load of the second leaf spring 14 in the Y-direction acts as preset force on the input shaft 4. The preset force increases neutral rigidity of the input shaft to ensure stability in straight traveling of the vehicle.

Then, supposing that the steering wheels are turned from the neutral position to rotate the input shaft 4 with respect to the output shaft 2 in a direction indicated at an arrow a in FIG. 2, inputting of torque of a predetermined level to the input shaft 4 permits the balls or rollers 23 to deflect the first leaf spring 13 and 14 against the preset force, so that the balls or rollers 23 may be displaced or dislocated from the spring-side and shaft-side support sections 17 and 22 while rolling in a direction indicated at an arrow b in FIG. 2.

When the input shaft 4 and output shaft 2 are further rotated relatively to each other, the balls or rollers 23 each are permitted to roll between the outer peripheral surface of the input shaft 4 and the rolling surface section 18 of the first leaf spring 13. In such a situation, rolling of the balls or rollers 23 causes force in any one of both X-directions to act on the first leaf springs 13. This results in elastic force of the first leaf spring 13 which acts to pressedly contact the holding sections 20 of the second leaf spring 14 with the side surfaces 11 of the spring receiving chamber 9 being increased on one side end of the first leaf spring 13 and decreased on the other side end thereof.

Such non-uniformity in elastic force of the first leaf spring 13 at the holding sections 20 of the first leaf spring 13 possibly leads to deviation or displacement of the first leaf spring 13 in the X-directions at the holding sections 20 of the first leaf spring 13 pressedly contacted with the side surfaces 11 of the spring receiving chamber. In order to avoid such a disadvantage, the power steering device of the illustrated embodiment, as noted from the above, is constructed so as to permit the press contact between the first leaf spring 13 and the side surfaces 11 to be previously carried out with increased initial load, to thereby prevent deviation or displacement of the first leaf spring 13 in the X-directions due to any possible non-uniformity in elastic force of the first leaf spring 13.

Also, such possible non-uniformity in elastic force of the first leaf spring does not affect elastic force of the second leaf spring 14 in the Y-direction, so that the elastic force of the second leaf spring 14 may be kept from being varied due to the non-uniformity.

Dislocation or displacement of the ball or rollers 23 from the support sections 17 and 22 leads to deflection of the first leaf spring 13, to thereby permit the first leaf spring 13 to exhibit elastic force in the Y-direction. Whole elastic force in the Y-direction is determined depending on synthesis between the elastic force of the first leaf spring 13 in the Y-direction and that of the second leaf spring 14. Nevertheless, the illustrated embodiment, as noted from the above, permits the hole elastic force in the Y-direction to predominantly depend on the elastic force of the second leaf spring 14. Further, non-uniformity in elastic force of the first leaf spring 13 in at least one of both X-directions at the holding sections 20 of the first elastic force 13 does not substantially cause a variation in elastic force of the first leaf spring 13 in the Y-direction.

The first leaf springs 13 each may be constructed so as to exhibit, in the X-directions, only elastic force which is merely required to pressedly contact the holding sections 20 of the first leaf spring 13 with the side surfaces 11 of the spring receiving chamber 9. Alternatively, the illustrated embodiment may be constructed so that the first leaf spring 13 exhibits a slight amount of elastic force due to deflection thereof in the Y-direction, resulting in substantially whole elastic force in the Y-direction being obtained substantially by the second leaf spring 14.

Also, the illustrated embodiment is constructed in such a manner that relative rotation between the input shaft 4 and the output shaft 2 in a maximum amount permits each of the balls or rollers 23 to be abutted against any one of the projection sections 21 of each of the first leaf springs 13. At this time, the projection sections 21 each act as a stopper which functions to restrain further movement of the balls or rollers 23, so that the balls or rollers 23 each may be prevented from being dislocated from between the rolling surface sections 18 of the first leaf spring 13 and the outer peripheral surface of the input shaft 4.

As described above, relative rotation between the input shaft 4 and the output shaft 2 leads to changing-over of the rotary valve v to control hydraulic oil in the power cylinder 1, resulting in assisting force being generated. The assisting force permits the wheels of the vehicle to be turned to any desired target value, so that the output shaft 2 and input shaft 4 are returned to the neutral position, during which the balls or rollers 23 are returned to the support sections 17 and 22 while rolling, resulting in being returned to the neutral position as shown in FIG. 2.

The power steering device of the illustrated embodiment thus constructed permits preset force of the spring structures to be applied to the input shaft 4, so that neutral rigidity of the input shaft 4 may be increased to ensure stability in straight traveling of the vehicle. Also, incorporation of the spring structures in the spring receiving chamber 9 may be readily carried out by merely superposing the first leaf springs 13 on the second leaf springs 14 and pressedly contacting the first leaf springs 13 with the side surfaces 11 of the spring receiving chamber 9.

Further, in the illustrated embodiment, the first leaf springs 13 which exhibit elastic force in the Y-direction, as well as in the X-directions to prevent displacement thereof in the X-directions and the second leaf springs 14 which exhibit elastic force in the Y-direction are arranged separately from each other. Such arrangement of the first and second leaf springs 13 and 14 decreases a variation in elastic force in the Y-direction as compared with a spring structure constructed so as to cause a single leaf spring to exhibit both functions. More particularly, the preset force obtained when the input shaft 4 and output shaft 2 are at the neutral position is determined substantially depending on the second leaf springs 13, resulting in a variation of the preset force being substantially prevented. Also, non-uniformity in elasticity of the first leaf spring 13 at the holding sections 20 of the first leaf spring 13 possibly occurring during rolling of the balls or rollers 23 does not substantially cause any variation in whole elastic force of the both springs 13 and 14 in the Y-direction because the elastic force substantially depends on the second leaf springs 14.

Further, formation of the first and second leaf springs 13 and 14 in a manner to be separate from each other permits each of the leaf springs to be reduced in thickness and improves workability thereof. Also, it permits the spring structures to exhibit increased durability as compared with the case that it is constructed of a single leaf spring. For example, the first leaf springs 13 substantially exhibit elastic force in the X-directions, to thereby relieve stress correspondingly, resulting in the spring structure being increased durability. Also, the second leaf springs 14 each are merely required to exhibit elastic force in the Y-direction, resulting in a configuration thereof being simplified and durability thereof being increased.

Figure 5:
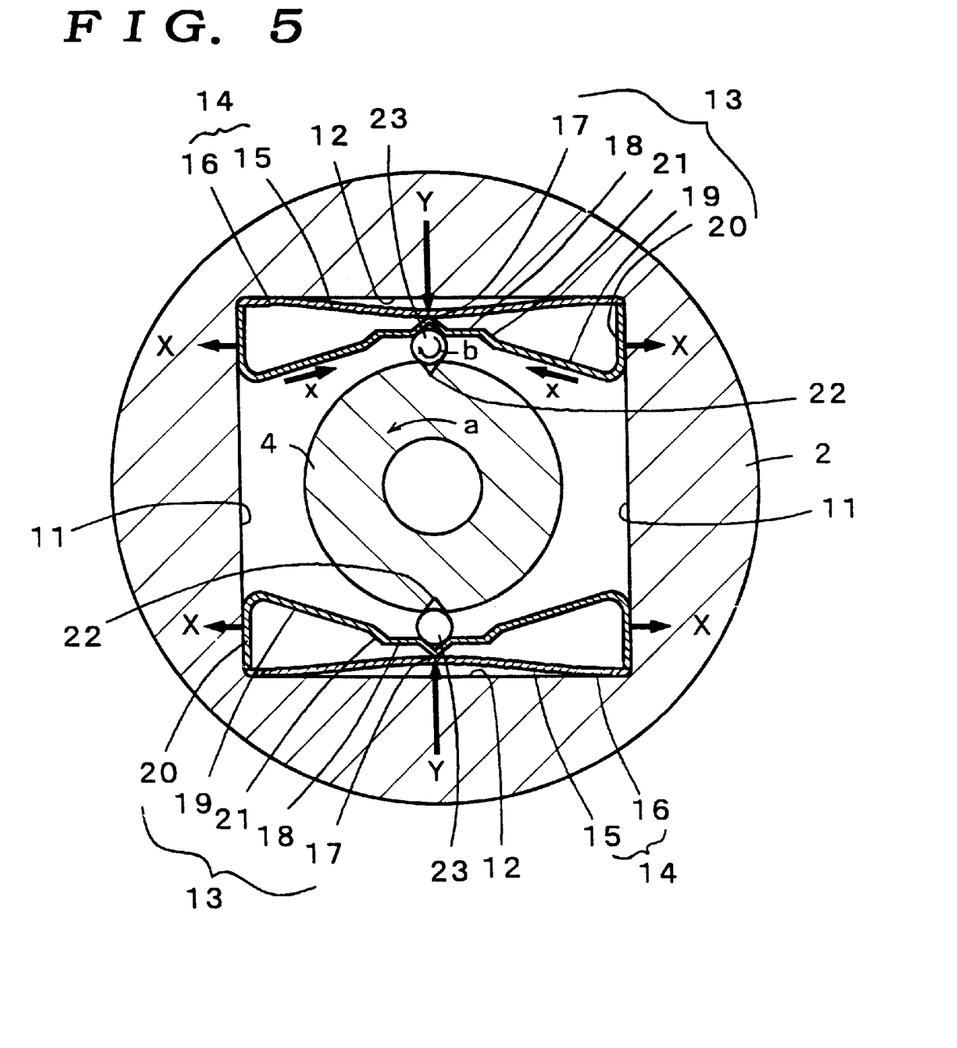
FIG. 5 is a sectional view showing a spring receiving chamber defined in a second embodiment of a power steering device according to the present invention, which is likewise embodied in the form of a hydraulic power steering device.

Referring now to FIG. 5, a second embodiment of a power steering device according to the present invention is illustrated. A power steering device of the illustrated embodiment is merely different in construction of a first leaf spring 13 from the first embodiment described above. More particularly, the first leaf spring 13 likewise includes central a spring-side support section 17 constituted by a V- or U-shaped groove, a pair of rolling surface sections 18 arranged so as to be contiguous to both ends of the spring-side support section 17 and outwardly extend therefrom while interposing the central spring support section 17 therebetween, and a pair of projection sections 21 arranged so as to be contiguous to the rolling surface sections 18 and outwardly extend therefrom.

Also, the first leaf spring 13 includes a pair of support leg sections 19 formed so as to be contiguous to the projection sections 21 and outwardly extend therefrom. However, the support leg sections 19 each are arranged so as to be inclined toward an input shaft 4 without forming any step with respect to the projection 21, unlike that in the first embodiment. Further, the first leaf spring 13 includes a pair of curved holding sections 20 formed so as to be contiguous to the support leg sections 19 and outwardly extend therefrom. However, the curved holding sections 20 each are arranged so as to be curved in a direction away from the input shaft 4, unlike that in the first embodiment.

The thus-formed first leaf springs 13 each are superposedly arranged on a second leaf spring 14 in such a manner that an apex of each of curved sections 15 of the second leaf spring 14 is positioned on a rear side of the spring-side support section 17 of the first leaf spring 13. Then, the first leaf springs 13 each are securely held on side surfaces 11 of a spring receiving chamber while being pressedly contacted therewith.

The remaining part of the second embodiment may be constructed in substantially the same manner as the first embodiment described above.

The power steering device of the second embodiment thus constructed permits the first leaf springs 13 to be increased in durability as compared with the first embodiment. More particularly, dislocation of balls or rollers 23 from the support sections 17 and 22 causes the first and second leaf springs 13 and 14 to be deflected. At this time, in the first embodiment described above, the holding sections 20 of each of the first leaf springs 13 are forcedly pressed against the side surfaces 11 of the spring receiving chamber 9 in the directions indicated at the arrows X in FIG. 2. This results in force which acts on the first leaf springs 13 being correspondingly increased, leading to generation of stress of an increased magnitude, so that the first leaf spring 13 are reduced in durability. On the contrary, the illustrated or second embodiment results in the holding sections 20 of each of the first leaf springs 13 being pulled in directions away from the side surfaces 11 of the spring receiving chamber or in directions indicated at arrows X in FIG. 5, during deflection of the first and second leaf springs 13 and 14. This permits force which is applied to each of the first leaf springs 13 to be correspondingly decreased, leading to alleviation of stress, resulting in durability of the first leaf springs 13 being increased.

It is a matter of course that the holding sections 20 of each of the first leaf springs 13 are constructed so as to exhibit, in the X-directions, elastic force sufficient to prevent displacement or deviation of the first leaf spring 13 when they are pulled in directions in which they are separated from the side surfaces 11 of the spring receiving chamber or in the X-directions in FIG. 5.

The remaining part of the second embodiment may be constructed in substantially the same manner as the first embodiment described above.

Figure 6:
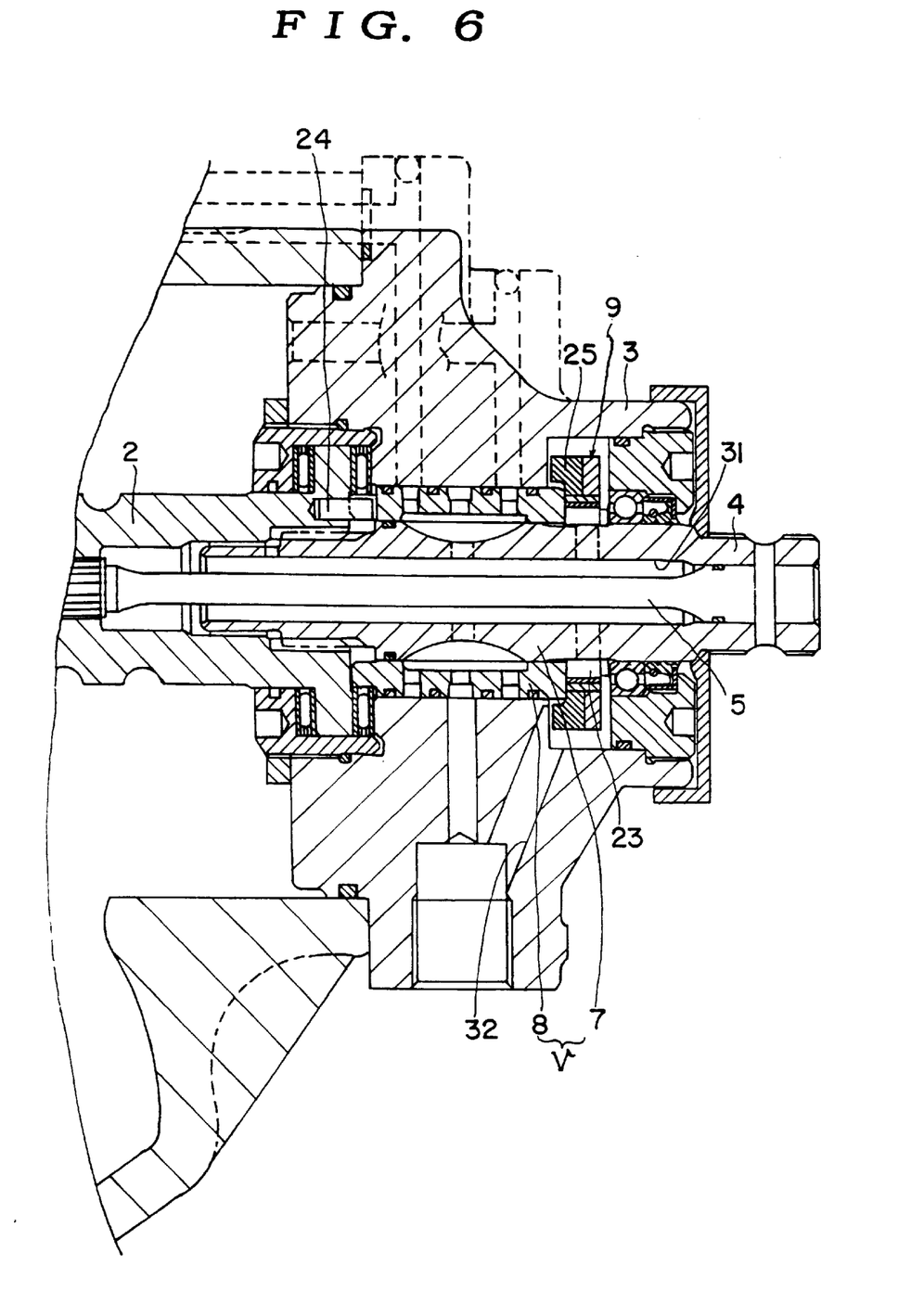
FIG. 6 is a fragmentary sectional view showing an essential part of a third embodiment of a power steering device according to the present invention, which is likewise embodied in the form of a hydraulic power steering device.
Figure 7:
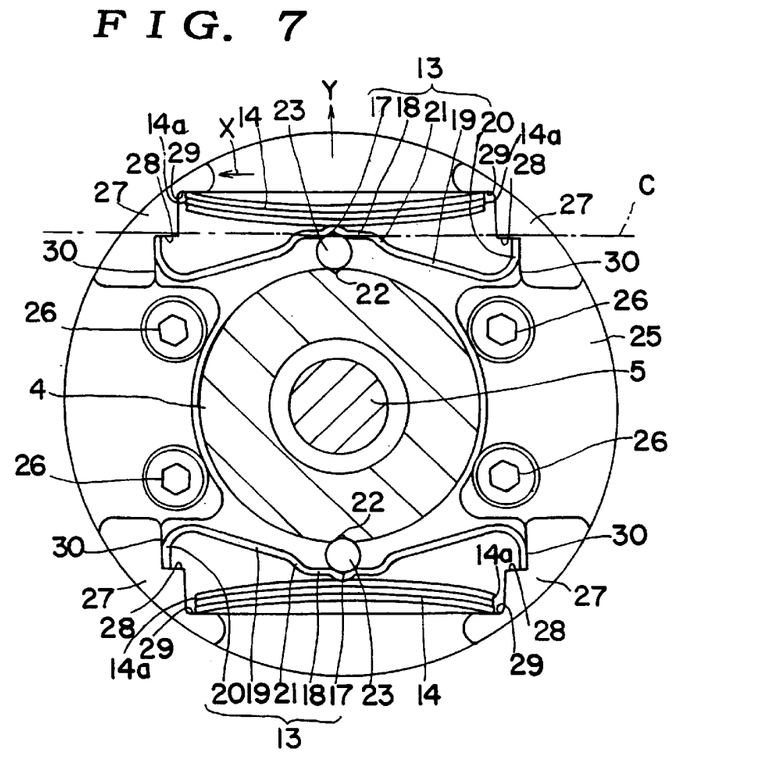
FIG. 7 is a sectional view showing a spring receiving chamber defined in the power steering device of FIG. 6.
Figure 8:
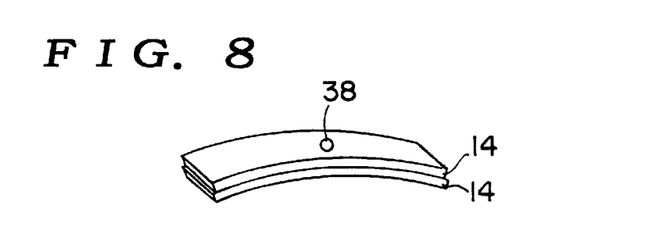
FIG. 8 is a perspective view showing two spot-welded leaf spring elements for a second leaf spring which are incorporated in the power steering device of FIG. 6.

Referring now to FIGS. 6 to 8, a third embodiment of a power steering device according to the present invention is illustrated. A power steering device of the illustrated embodiment is constructed in such a manner that a spring setting section is provided in a member arranged so as to be rotated integrally with an output shaft 2, unlike each of the first and second embodiment described above in which the spring setting section is directly provided in the output shaft 2. More particularly, the power steering device of the illustrated embodiment, as shown in FIGS. 6 and 7, is of the integral type like the first embodiment described above. However, a sleeve 8 constituting a rotary valve v is not formed integrally with the output shaft 2 but provided as a member separate therefrom which is connected through a pin 24 to the output shaft 2. A valve casing 3 is provided with a diameter increased section or a section of which a diameter is increased and a ring-like disc member 25 is received in the thus-provided diameter increased section of the valve casing 3. Then, the disc member 25 is connected to an end of the sleeve 8 by means of bolts 26.

Thus, in the illustrated embodiment, the disc member 25 provided with the spring setting section is connected through the sleeve 8 arranged separate from the disc member 25 to the output shaft 2, resulting in being rotated integrally with the output shaft 2.

The disc member 25, as shown in FIG. 7, includes four supports 27, each of which is provided with a first step section 28 for setting a first leaf spring 13 thereon and a second step section 29 for setting a second leaf spring 14 thereon. Also, the support 27 includes a side surface 30 arranged opposite to the first step section 28, with which each of holding sections 20 of the first leaf spring 13 constructed as in the second embodiment is pressedly contacted. At this time, press contact between the holding section 20 of the first leaf spring 13 and the side surface 30 of each of the supports 27, as shown in FIG. 7, is desirably carried out in such a manner that a portion of the holding section 20 contacted with the side surface 30 is positioned substantially on an extension line c defined by connecting two points at which a spring-side support section 17 of the first leaf spring 13 is contacted with each of balls or rollers 23 to each other. When the contact portion of the holding section 20 is deviated substantially from the extension line c, the ball or roller 23 is caused to roll; so that when force in X-directions is applied to the first leaf spring 13, deviation occurs between the force in the X-directions and reaction force applied to the first leaf spring 13 from the side surfaces 30. This results in the first leaf spring 13 being readily displaced from a predetermined set position.

On the contrary, when the contact portion of each of the holding sections 20 of the first leaf spring 13 is positioned on the extension line c, the ball or roller 23 is permitted to roll; so that the force applied to the first leaf spring 13 in the X-directions may be substantially opposite to reaction force applied to the first leaf spring 13 from the side surfaces 30, resulting in substantially preventing dislocation or displacement of the first leaf spring 13.

The second leaf springs 14 each are supported at each of both ends thereof on the second step section 29 of each of the supports 27. In the illustrated embodiment, although the second leaf spring 14 is not provided with any flat section, it exhibits substantially the same function as the second leaf spring 14 in each of the first and second embodiments described above.

Also, the second leaf spring 14 is constructed of three leaf spring elements superposed on each other. The number of leaf spring elements may be suitably varied depending on preset force required. A plurality of such leaf spring elements may be previously fixed on each other using any suitable means such as spot welding or the like as shown in FIG. 8. In FIG. 8, reference numeral 38 designates a spot-welded portion.

Thus, the power steering device of the third embodiment, as described above, is so constructed that the first and second leaf springs 13 and 14 are arranged on the disc member 25. Such construction permits a connection position of the disc member 25 to be determined after adjustment of centering of the rotary valve v. More particularly, when a clearance or play is provided between each of threaded holes (not shown) formed in the disc member 25 so as to act as an insertion hole and each of the fixing bolts 26 to permit the disc member 25 to be moved in both the rotation direction and a radial direction, the connection position of the disc member 25 may be finely adjusted. Thus, it is possible to arrange the first and second leaf springs 13 and 14 on the disc member 25, to thereby adjust preset force after adjustment of centering of the rotary valve v, so that assisting force characteristics of the power steering device may be readily controlled.

Also, a variation in the number of leaf spring elements for the second leaf spring 14 permits the preset force to be simply varied. Further, previous fixing of the leaf spring elements for the second leaf spring 14 on each other by spot welding or the like prevents separation of the leaf spring elements during incorporation of the second leaf spring 14 in the disc member 25, to thereby facilitate the incorporation. In particular, the leaf spring elements for the second leaf spring 14 may be arranged in such a manner that each two or three leaf spring elements are fixed together in each one set. Such arrangement permits the illustrated embodiment to address to an increase in the number of leaf spring elements. For example, when four leaf spring elements are required, two sets each including two leaf spring elements may be used. Also, when it is required to construct the second leaf spring 14 of five leaf spring elements, one set of two such leaf spring elements may be combined with one set of three such leaf springs. Thus, the above-described arrangement of the leaf spring elements facilitates incorporation of the second leaf spring 14 in the disc member 25 and confirmation of the number of leaf spring elements for the second leaf spring 14 irrespective of an increase in the number of leaf spring elements.

Also, the rotary valve v incorporated in the power steering device of the illustrated embodiment, as shown in FIG. 6, is so constructed that an inner space of the input shaft 4 in which a torsion bar 5 is incorporated acts also as a tank passage 31 for the rotary valve v. The tank passage 31 is arranged so as to communicate with a tank (not shown) through both the above-described diameter increased section of the valve casing 3 and a passage in the valve casing 3. This permits hydraulic oil to flow through the spring setting section in which the first and second leaf springs 13 and 14 are arranged, to thereby act as lubricating oil, resulting in ensuring smooth rolling of the balls or rollers 23.

The remaining part of the third embodiment may be constructed in substantially the same manner as the first or second embodiment described above.

Figure 9:
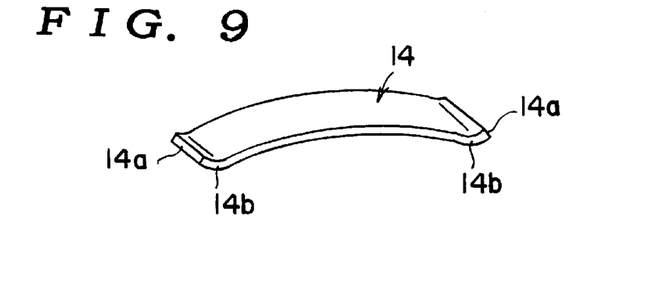
FIG. 9 is a perspective view showing a second leaf spring incorporated in a fourth embodiment of a power steering device according to the present invention.
Figure 10:
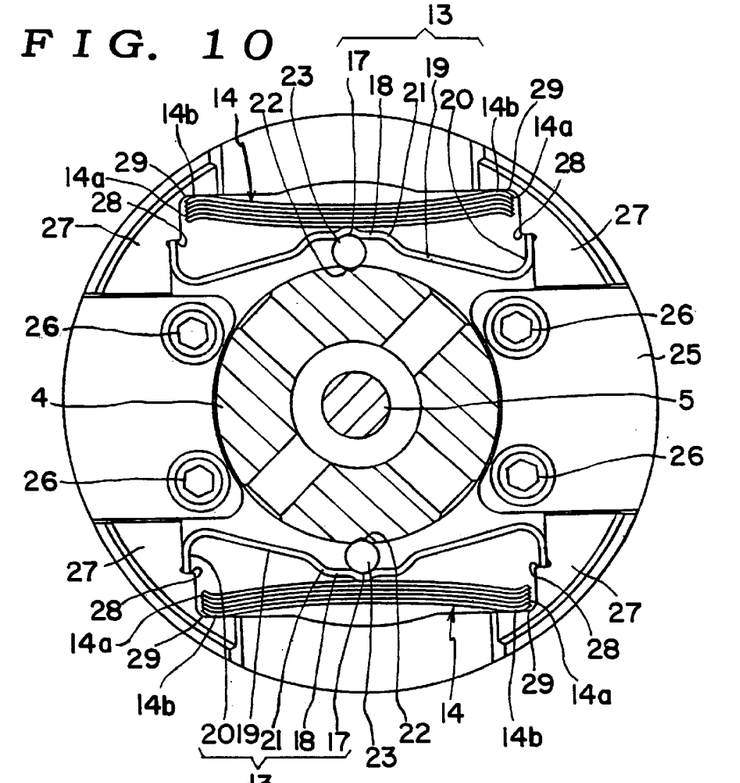
FIG. 10 is a sectional view showing a spring receiving chamber defined in a fourth embodiment of a power steering device according to the present invention.

Referring now to FIGS. 9 and 10, a fourth embodiment of a power steering device according to the present invention is illustrated. A power steering device of the illustrated embodiment is different in configuration of second leaf springs 14 from the third embodiment described above. More particularly, as shown in FIGS. 9 and 10, the second leaf springs 14 each are curved at both ends thereof toward an input shaft 4 to provide curved sections 14b. The thus-provided curved sections 14b of each of the second leaf springs 14 each are then forced against a second step 29.

More particularly, when the input shaft 4 and a disc member 25 are rotated relatively to each other to dislocate balls or rollers 23 from support sections 17 and 22, first leaf springs 13 and the second leaf springs 14 each are outwardly forced. This results in each of the second leaf springs 14 being forced at each of both ends thereof against the second step 29.

In this connection, the third embodiment described above, as shown in FIG. 7, is so constructed that the second leaf spring 14 is slid at each of both ends 14a on the second step 29. Unfortunately, the ends 14a of the second leaf spring 14 are as cut, to thereby be sharp, resulting in frictional force between the end 14a and the second step 29 being highly increased. This causes end surfaces of the second leaf spring 14 and the second step contacted therewith to be highly worn away, so that preset force provided by the second leaf spring 14 is varied, leading to a variation in assisting force characteristics of the power steering device.

On the contrary, the illustrated or fourth embodiment is constructed so as to abut each of the curved sections 14b formed at both ends of the second leaf spring 14 against the second step 29, to thereby facilitate sliding of the second leaf spring 14 on the second steps 29. This permits frictional force between the second leaf spring 14 and the second steps 29 to be reduced, leading to a reduction in wearing, so that the fourth embodiment may exhibit stable assisting force characteristics for an increased length of time.

The above-described configuration of the second leaf springs 14 employed in the fourth embodiment may be likewise applied to each of the first and second embodiments described above. This permits the first and second embodiments to exhibit substantially the same advantage of the fourth embodiment described above.

The remaining part of the fourth embodiment may be constructed in substantially the same manner as the third embodiment described above.

Figure 11:
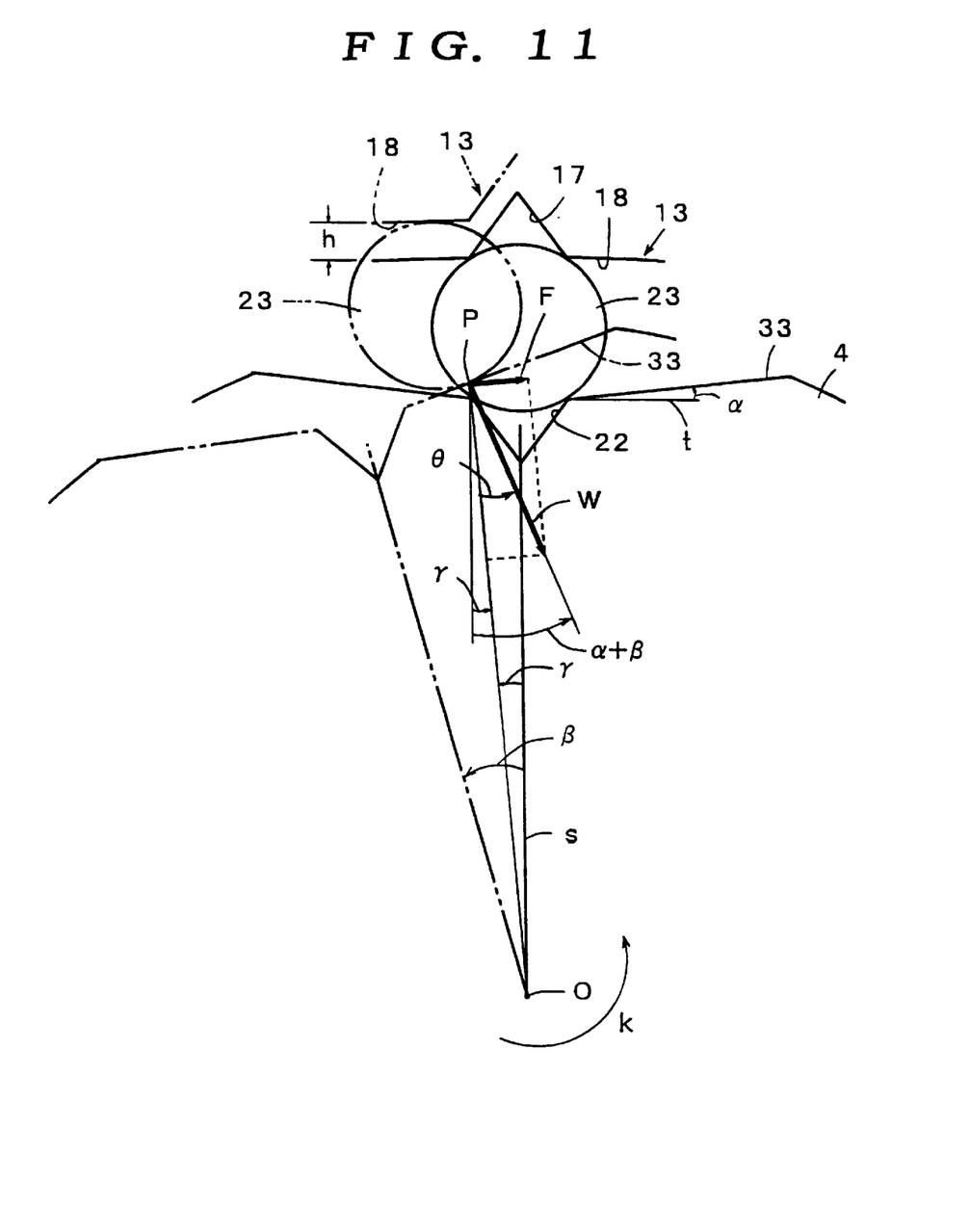
FIG. 11 is an enlarged diagrammatic view showing a rolling surface of an input shaft and a vicinity thereof in a fifth embodiment of a power steering device according to the present invention.

Referring now to FIG. 11, a fifth embodiment of a power steering device according to the present invention is illustrated. In a power steering device of the illustrated or fifth embodiment, an output shaft 2 is formed on an outer peripheral surface thereof with a rolling surface 33 in a manner to be contiguous to both sides of a shaft-side support section 22 of the output shaft 2. This permits each of balls or rollers 23 displaced from both support sections 17 and 22 to roll between the rolling surface 33 and a rolling surface section 18 of each of first leaf springs 13.

The first embodiment described above is so constructed that the balls or rollers 23 dislocated from both support sections 17 and 22 each may roll between the outer peripheral surface of the cylindrical input shaft 4 and the rolling surface section 18 of each of the first leaf springs 13. At this time, the ball or roller 23 rolls while being contacted at only one point thereof with the outer peripheral surface of the input shaft 4, during which elastic force of each of the first and second leaf springs 13 and 14 is directed to a center of the input shaft 4 at the one or single contact point. This keeps a component which acts as steering reaction force from being generated in the direction of rotation of the input shaft 4. This means that in the first embodiment, steering reaction force obtained during rolling of the balls or rollers 23 due to turning of the steering wheels is exhibited by only a torsional resistance of the torsion bar 5.

On the contrary, the illustrated or fifth embodiment is so constructed that the rolling surface 33 of the input shaft 4 which is arranged so as to be contiguous to both sides of the shaft-side support section 22 is formed so as not to conform with an arcuate surface defined about a center O of the input shaft 4 or the outer peripheral surface of the input shaft 4.

In FIG. 11, solid lines indicate the ball or roller 23 in a neutral state and two-dot chain lines indicate the ball or roller 23 rolling between the rolling surface 33 of the input shaft 4 and the rolling surface section 18 of the first leaf spring 13.

Also, in FIG. 11, a reference line defined by connecting a center of each of both support sections 17 and 22 and the center O of the input shaft 4 to each other is designated at s. When the input shaft 4 is rotated by an angle β with respect to the reference line s, force W at a contact point between the ball or roller 23 and the rolling surface 33 has an angle θ with respect to a line segment OP. This results in a component F=W·sinθ occurring in the direction of rotation of the input shaft 4 or in a direction perpendicular to the line segment OP. The component F acts to resist torque acting to rotate the input shaft 4, resulting in providing steering reaction force.

Thus, in the fifth embodiment, steering reaction force obtained during rolling of the ball or roller 23 due to turning of the steering wheels is provided by synthesis between the torsional resistance of the torsion bar 5 and the component F.

A configuration of the rolling surface 33 of the input shaft 4 is not limited to that employed in the illustrated embodiment. The rolling surface 33 may be formed into any desired configuration so long as it does not conform to the arcuate surface defined about the center O of the input shaft 4. Such a configuration leads to θ≠0, to thereby permit generation of the component.

For example, in FIG. 11, sinθ is constantly kept larger than zero (sinθ>0), so that the component F occurs in a direction opposite to the direction of rotation of the input shaft 4, to thereby increase the steering reaction force.

In this instance, the direction of the component F may be rendered identical with the direction of rotation of the input shaft 4 depending on an angle α of the rolling surface 33 with respect to a line t perpendicular to the reference line s, resulting in the steering reaction force being reduced. For example, in FIG. 11, when an angle between the line segment OP and the reference line s is indicated at γ, a variation in angle α permits sinθ to be below zero (sinθ<0) because of θ=α+β−γ, to thereby render the direction of the component F identical with the direction of rotation of the input shaft 4. The angles θ, α, β and γ each are set to be positive in a direction indicated at an arrow k.

Also, in FIG. 11, reference character h indicates the amount or magnitude of deflection of each of the first and second leaf springs 13 and 14 caused due to rolling of the balls or rollers 23. Elastic force of the springs 13 and 14 in a Y-direction is determined depending on the deflection h, resulting in generation of the force W at the contact point. The deflection h may be varied depending on a configuration of the rolling surface 33, a configuration of the first leaf spring 13, a spring constant of the second leaf spring and the like.

Thus, a configuration of the rolling surface 33, a configuration of the first leaf spring 13, a spring constant of the second leaf spring 14 and the like are suitably determined to generate the component F of a suitable magnitude, so that synthesis between the component F and a torsional resistance of the torsion bar 5 may lead to a variation in the steering reaction force or keep the steering reaction force constant as desired. This results in a satisfactory steering feeling being provided depending on a type of a vehicle or a user's demand.

In the illustrated embodiment, the rolling surface 33 of the input shaft 4 is formed to be flat. Alternatively, it may be curved.

The first to fifth embodiments each have been described in connection with the hydraulic power steering device of the integral type. However, it is a matter of course that the power steering device of the present invention may be constructed into a type other than the integral type.

Also, when the power steering device of the present invention is so constructed that the input shaft 4 and output shaft 2 are rotated relatively to each other while twisting the torsion bar 5, to thereby generate assisting force, it may be applied to a motor-driven power steering device as well as a hydraulic power steering device.

Figure 12:
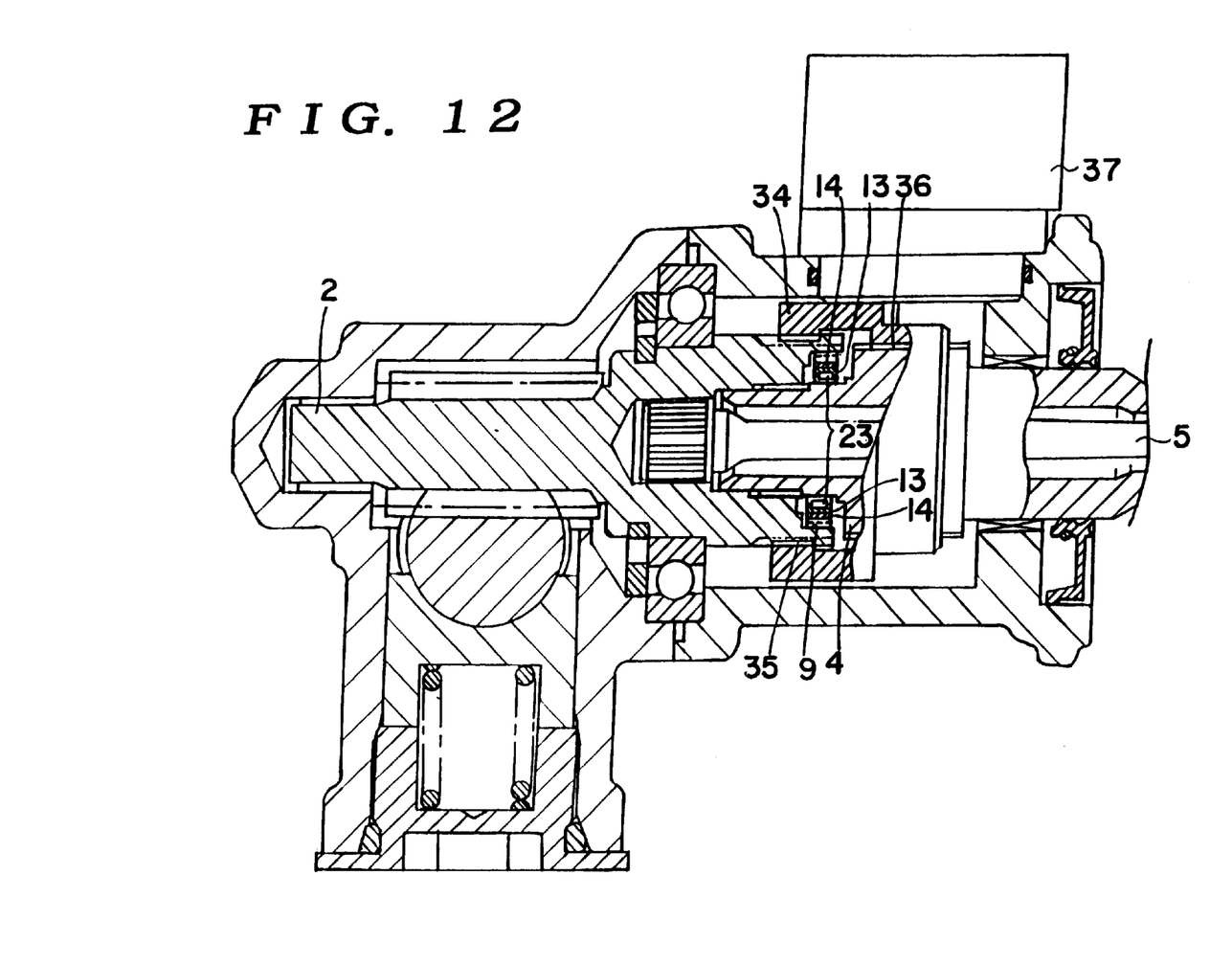
FIG. 12 is a sectional view showing a sixth embodiment of a power steering device according to the present invention, which is embodied in the form of a motor-driven power steering device.

Referring now to FIG. 12, a sixth embodiment of a power steering device according to the present invention is illustrated, which is directed to a motor-driven power steering device. More particularly, a power steering device of the sixth embodiment is constructed in such a manner that an input shaft 4 and an output shaft 2 are fittedly provided on an outer periphery thereof with a common slider 34, which is formed on an inner surface thereof with an internal thread 35 through which the slider 34 is coupled to the output shaft 2, as well as a spline 36 through which the slider 34 is coupled to the input shaft 4. Thus, relative rotation between the input shaft 4 and the output shaft 2 regulates rotation of the slider 34, resulting in the slider 34 being moved in an axial direction of the shafts.

Then, a torque sensor detects input torque depending on the amount of movement of the slider 34, so that an electric motor (not shown) is driven depending on the torque, resulting in assisting force being generated.

In such a motor-driven power steering device as well, first and second leaf springs 13 and 14 may be received in a spring receiving chamber 9 formed at an end of the output shaft 2, resulting in preset force being provided to increase neutral rigidity of the input shaft 4. A construction therefor and advantages thereof are the same as in the hydraulic power steering device.

As can be seen from the foregoing, the power steering device of the present invention is so constructed that the spring structures each are constituted by the first leaf spring and second leaf spring, wherein the first leaf spring of each of the spring structures includes the spring-side support section constituted by the V- or U-shaped groove, a pair of the rolling surface sections arranged so as to be contiguous to the spring-side support section and outwardly extend from both ends of the spring-side support section, a pair of the support leg sections each arranged so as to be contiguous to each of the rolling surface sections and outwardly extend therefrom, and a pair of the holding sections each arranged so as to be contiguous to each of the support leg sections and outwardly extend therefrom. The holding sections of the first leaf spring are pressedly contacted with press contact surfaces defining the spring setting section and the second leaf spring of each of the spring structures is constructed so as to exhibit elastic force for forcing each of the balls or rollers toward the input shaft through the rear surface of the first leaf spring. Such construction increases neutral rigidity of steering wheels of a vehicle due to application of preset force, to thereby ensure stability during straight traveling of the vehicle. Also, it facilitates incorporation of the first leaf springs in the spring setting section, because it is merely required to pressedly contact each of the holding sections of the first leaf spring with the side surface of the spring setting section.

Further, the first and second leaf springs are arranged separately from each other. Such arrangement highly reduces a variation in force for forcedly pressing the balls or rollers against the input shaft as compared with a spring structure constituted by a single leaf spring. Also, it permits the leaf springs to be reduced in thickness, to thereby improve workability thereof. Further, it permits the spring structure to exhibit increased durability as compared with the single leaf spring structure.

The present invention may be so constructed that the first leaf spring further includes a pair of the stoppers each arranged between each of the rolling surface sections and each of the support leg sections, wherein the balls or rollers each are arranged so as to be abutted against each of the stoppers when the input shaft and output shaft are rotated in a predetermined amount relatively to each other. Such construction regulates rolling of the balls or rollers when the input and output shafts are rotated relatively to each other, resulting in preventing dislocation of each of the balls or rollers from between the input shaft and the first leaf spring.

In addition, in the present invention, a pair of the support leg sections of the first leaf spring may be formed in a manner to be inclined toward the input shaft and a pair of the holding sections of the first leaf spring which are contiguous to the support leg sections may be formed so as to be curved in a direction away from the input shaft. This reduces force applied to the first leaf spring, to thereby alleviate stress, so that the first leaf spring may be increased in durability.

Also, in the present invention, the portion of each of the holding sections pressedly contacted with the press contact surfaces of the spring setting section may be positioned substantially on the extension line defined by connecting two points on the spring support section at which the spring support section is contacted with the balls or rollers at the neutral state. This permits the direction of force applied to the first leaf spring to be opposite to that of reaction force acting on the first leaf spring from the press contact surface.

Further, the present invention may be constructed in the manner the input shaft is formed with the rolling surface contiguous to each of both sides of each of the shaft-side support sections, the rolling surface of the input shaft is formed so as not to conform to the arcuate surface defined about the center of the input shaft, the balls or rollers each are constructed so as to roll between each of the rolling surface sections of the first leaf spring and the rolling surface of the input shaft when the input shaft and output shaft are rotated relatively to each other after the balls or rollers are dislocated from the spring-side and shaft-side support sections, and the balls or rollers are also constructed in the manner that force at the contact point between each of the balls or rollers and the rolling surface of the input shaft generates a component in a direction identical with or opposite to the direction of rotation of the input shaft. Such construction permits steering reaction force to be provided due to synthesis between the component and a torsional resistance of the torsion bar. Thus, a suitable variation in magnitude of the component leads to a variation in steering reaction force or keeps the steering reaction force constant, so that the power steering device may exhibit an satisfactory steering feeling.

Also, in the present invention, the member provided with the spring setting section may be formed with the insertion hole, into which the fixing member is inserted to connect the member directly or indirectly to the output shaft and the insertion hole and fixing member may be so arranged that a clearance which permits the position at which the member is connected to the output shaft to be finely adjusted is defined therebetween. This permits the incorporation of the first and second leaf springs to be carried out after adjustment of centering of the input and output shafts, so that the assisting force characteristics may be readily controlled.

Furthermore, the second leaf springs each may be constituted by a plurality of the leaf spring elements superposed on each other. This facilitates adjustment of the preset force and therefore control of the assisting force characteristics.

Moreover, in the present invention, two or three of the leaf spring elements for each of the second leaf springs may be previously fixedly superposed on each other, resulting in ensuring integrity of the second leaf spring.

In addition, in the present invention, the second leaf spring may be curved at both ends thereof toward the input shaft, so that a frictional force acting on the second leaf spring may be minimized, to thereby permit the power steering device to stably exhibit the assisting force characteristics over a long period of time.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A power steering device comprising:

an input shaft operatively connected to steering wheels;

an output shaft operatively connected to wheels;

a torsion bar for connecting said input shaft and output shaft to each other therethrough;

said input shaft and output shaft generating assisting force depending on the amount of rotation thereof when they are rotated relatively to each other while twisting said torsion bar;

a member arranged so as to be rotated integrally with said output shaft;

a spring setting section provided at one of said output shaft and member;

a pair of leaf spring structures arranged in said spring setting section so as to interpose said input shaft therebetween;

said leaf spring structures each being provided with a spring-side support section;

said input shaft being formed on an outer peripheral surface thereof with shaft-side support sections;

said shaft-side support sections of said input shaft each being arranged so as to be opposite to said spring-side support section of each of said leaf springs when said input shaft and output shaft are in a neutral state; and balls or rollers each interposedly arranged between each of said spring-side support sections and each of said shaft-side support sections opposite to each other;

said balls or rollers being arranged so as to deflect said leaf spring structures, resulting in being displaced from said spring-side and shaft-side support sections while rolling therebetween when said input shaft and output shaft are rotated relatively to each other;

said balls or rollers each being arranged so as to roll between each of said leaf spring structures and said input shaft after they are displaced from said support sections;

said leaf spring structures each being constituted by a first leaf spring and a second leaf spring;

said first leaf spring of each of said leaf spring structures including said spring-side support section constituted by a V- or U-shaped groove, a pair of rolling surface sections arranged so as to be contiguous to said spring-side support section and outwardly extend from both ends of said spring-side support section, a pair of support leg sections each arranged so as to be contiguous to each of said rolling surface sections and outwardly extend therefrom, and a pair of holding sections each arranged so as to be contiguous to each of said support leg sections and outwardly extend therefrom;

said holding sections of said first leaf spring being pressedly contacted with press contact surfaces defining said spring setting section;

said second leaf spring of each of said leaf spring structures being constructed so as to exhibit elastic force for forcing each of said balls or rollers toward said input shaft through a rear surface of said first leaf spring.

2. A power steering device as defined in claim 1, wherein said first leaf spring further includes a pair of stoppers each arranged between each of said rolling surface sections and each of said support leg sections;

said balls or rollers each being arranged so as to be abutted against each of said stoppers when said input shaft and output shaft are rotated in a predetermined amount relatively to each other.

3. A power steering device as defined in claim 1, wherein a pair of said support leg sections of said first leaf spring are formed in a manner to be inclined toward said input shaft; and a pair of said holding sections of said first leaf spring which are contiguous to said support leg sections are formed so as to be curved in a direction away from said input shaft.

4. A power steering device as defined in claim 1, wherein a portion of each of said holding sections pressedly contacted with said press contact surfaces of said spring setting section is positioned substantially on an extension line defined by connecting two points on said spring support section at which said spring support section is contacted with said balls or rollers at a neutral state.

5. A power steering device as defined in claim 1, wherein said input shaft is formed with a rolling surface contiguous to each of both sides of each of said shaft-side support sections;

said rolling surface of said input shaft being formed so as not to conform to an arcuate surface defined about a center of said input shaft;

said balls or rollers each are constructed so as to roll between each of said rolling surface sections of said first leaf spring and said rolling surface of said input shaft when said input shaft and output shaft are rotated relatively to each other after said balls or rollers are dislocated from said spring-side and shaft-side support sections; and said balls or rollers are also constructed in such a manner that force at a contact point between each of said balls or rollers and said rolling surface of said input shaft generates a component in a direction identical with or opposite to a direction of rotation of said input shaft.

6. A power steering device as defined in claim 1, wherein said member provided with said spring setting section is formed with an insertion hole, into which a fixing member is inserted to connect said member directly or indirectly to said output shaft; and said insertion hole and fixing member are so arranged that a clearance which permits a position at which said member is connected to said output shaft to be finely adjusted is defined therebetween.

7. A power steering device as defined in claim 1, wherein said second leaf springs each are constituted by a plurality of leaf spring elements superposed on each other.

8. A power steering device as defined in claim 7, wherein two or three of said leaf spring elements of said second leaf spring are previously fixedly superposed on each other.

9. A power steering device as defined in claim 1, wherein said second leaf spring is curved at both ends thereof toward said input shaft.

\* \* \* \* \*